(12) United States Patent
DiGioacchino et al.

(10) Patent No.: US 12,286,096 B2
(45) Date of Patent: Apr. 29, 2025

(54) OCCUPANCY BASED PARKING ALIGNMENT FOR AUTOMATED AND ASSISTED PARKING

(71) Applicant: GM GLOBAL TECHNOLOGY OPERATIONS LLC, Detroit, MI (US)

(72) Inventors: Patrick Giancarlo Gabriel DiGioacchino, Niagra Falls (CA); Utkarsh Saini, Pickering (CA); Fred W Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 18/047,737

(22) Filed: Oct. 19, 2022

(65) Prior Publication Data
US 2024/0132056 A1 Apr. 25, 2024
US 2024/0227784 A9 Jul. 11, 2024

(51) Int. Cl.
*B60W 30/06* (2006.01)
*B60W 50/14* (2020.01)
*G01C 21/34* (2006.01)

(52) U.S. Cl.
CPC ............ *B60W 30/06* (2013.01); *B60W 50/14* (2013.01); *G01C 21/3476* (2013.01); *B60W 2050/146* (2013.01); *B60W 2552/53* (2020.02); *B60W 2554/801* (2020.02)

(58) Field of Classification Search
CPC ................. B60W 30/06; B60W 50/14; B60W 2050/146; B60W 2552/53; B60W 2554/801; B60W 2540/01; B60W 2540/227; B60W 2754/20; G01C 21/3476
See application file for complete search history.

(56) References Cited

U.S. PATENT DOCUMENTS

| | | | |
|---|---|---|---|
| 2018/0354502 A1* | 12/2018 | Yaldo | B62D 15/0285 |
| 2019/0031239 A1* | 1/2019 | Nakamura | G05D 1/0088 |
| 2019/0371171 A1* | 12/2019 | Sholingar | B60Q 1/32 |
| 2020/0086852 A1* | 3/2020 | Krekel | B60W 50/14 |
| 2020/0398865 A1* | 12/2020 | Tsujino | B60W 60/0025 |

* cited by examiner

*Primary Examiner* — Aniss Chad
*Assistant Examiner* — Christine Nguyen Huynh
(74) *Attorney, Agent, or Firm* — Lorenz & Kopf LLP

(57) ABSTRACT

Methods and systems are provided for controlling alignment of a vehicle during parking that include obtaining sensor data via one or more sensors of a vehicle, as to passenger occupancy of the vehicle and as to a parking location for the vehicle; identifying, via a processor of the vehicle, which passenger seats of the vehicle are occupied, based on the sensor data; identifying, via the processor, the parking location based on the sensor data; and determining, via the processor, an offset for parking of the vehicle in the parking location, based at least in part on which passenger seats of the vehicle are occupied.

17 Claims, 12 Drawing Sheets

OCCUPANCY BASED PARKING ALIGNMENT FOR AUTOMATED AND ASSISTED PARKING

TECHNICAL FIELD

The technical field generally relates to vehicles and, more specifically, to methods and systems for planning alignment for parking of vehicles.

BACKGROUND

Certain vehicles today have parking features in which the vehicle provides for automated or assisted parking. However, existing techniques may not always provide optimal solutions, for example for occupants of the vehicle to ingress and egress from the vehicle.

Accordingly, it is desirable to provide improved methods and systems for planning alignment for parking for vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling alignment of a vehicle during parking is provided that includes: obtaining sensor data via one or more sensors of the vehicle, as to passenger occupancy of the vehicle and as to a parking location for the vehicle; identifying, via a processor of the vehicle, which passenger seats of the vehicle are occupied, based on the sensor data; identifying, via the processor, the parking location based on the sensor data; and determining, via the processor, an offset for parking of the vehicle in the parking location, based at least in part on which passenger seats of the vehicle are occupied.

Also in an exemplary embodiment, the method further includes providing instructions for parking the vehicle using the offset, via the processor.

Also in an exemplary embodiment, the method further includes automatically parking the vehicle in the parking location using the offset, via the instructions provided by the processor.

Also in an exemplary embodiment, the method further includes performing assistance for a human for parking the vehicle in the parking location using the offset, via the instructions provided by the processor as presented to a human driver via a display of the vehicle.

Also in an exemplary embodiment, the step of determining the offset includes determining, via the processor, the offset based at least in part on which passengers are disposed only in a passenger side of the vehicle, only in a driver side of the vehicle, or both the passenger side and the driver side of the vehicle.

Also in an exemplary embodiment, the step of determining the offset includes determining, via the processor, the offset based at least in part on whether there is sufficient space for egress and ingress of passengers on only on a passenger side of the vehicle, only on a driver side of the vehicle, or on both the passenger side and the driver side of the vehicle.

Also in an exemplary embodiment, the method further includes: identifying a plurality of lane markings for the parking location, via the processor using the sensor data; identifying one or more objects surrounding the vehicle, via the processor using the sensor data; and calculating respective distances between the one or more objects and the lane markings, via the processor using the sensor data; wherein the step of determining the offset includes determining, via the processor, the offset based at least in part on the lane markings, the one or more objects surrounding the vehicle, and the respective distances between the one or more objects and the lane markings.

In another exemplary embodiment, a system is provided for controlling alignment of a vehicle during parking, that includes one or more sensors of a vehicle and a processor. The one or more sensors are configured for obtaining sensor as to passenger occupancy of the vehicle and as to a parking location for the vehicle. The processor is coupled to the sensor data, and is configured to at least facilitate: identifying which passenger seats of the vehicle are occupied, based on the sensor data; identifying the parking location based on the sensor data; and determining an offset for parking of the vehicle in the parking location, based at least in part on which passenger seats of the vehicle are occupied.

Also in an exemplary embodiment, the processor is further configured to at least facilitate providing instructions for parking the vehicle using the offset.

Also in an exemplary embodiment, the processor is further configured to at least facilitate automatically parking the vehicle in the parking location using the offset.

Also in an exemplary embodiment, the processor is further configured to at least facilitate performing assistance for a human for parking the vehicle in the parking location using the offset, via the instructions provided by the processor as presented to a human driver via a display of the vehicle.

Also in an exemplary embodiment, the processor is further configured to at least facilitate determining the offset based at least in part on which passengers are disposed only in a passenger side of the vehicle, only in a driver side of the vehicle, or both the passenger side and the driver side of the vehicle.

Also in an exemplary embodiment, the processor is further configured to at least facilitate determining the offset based at least in part on whether there is sufficient space for egress and ingress of passengers on only on a passenger side of the vehicle, only on a driver side of the vehicle, or on both the passenger side and the driver side of the vehicle.

Also in an exemplary embodiment, the processor is further configured to at least facilitate: identifying a plurality of lane markings for the parking location, using the sensor data; identifying a plurality of objects surrounding the vehicle, using the sensor data; calculating a plurality of respective distances between the plurality of objects and the lane markings, using the sensor data; and determining the offset based at least in part on the lane markings, the objects surrounding the vehicle, and the respective distances between the objects and the lane markings.

In another exemplary embodiment, a vehicle is provided that includes: a body; a drive system; one or more sensors; and a processor. The drive system is configured to generate movement of the body. The one or more sensors are configured for obtaining sensor as to passenger occupancy of the vehicle and as to a parking location for the vehicle. The processor is coupled to the sensor data, and is configured to at least facilitate: identifying which passenger seats of the vehicle are occupied, based on the sensor data; identifying the parking location based on the sensor data; and determining an offset for parking of the vehicle in the parking location, based at least in part on which passenger seats of the vehicle are occupied.

Also in an exemplary embodiment, the processor is further configured to at least facilitate providing instructions for automatically parking the vehicle using the offset.

Also in an exemplary embodiment, the processor is further configured to at least facilitate performing assistance for a human for parking the vehicle in the parking location using the offset, via instructions provided by the processor as presented to a human driver via a display of the vehicle.

Also in an exemplary embodiment, the processor is further configured to at least facilitate determining the offset based at least in part on which passengers are disposed only in a passenger side of the vehicle, only in a driver side of the vehicle, or both the passenger side and the driver side of the vehicle.

Also in an exemplary embodiment, the processor is further configured to at least facilitate determining the offset based at least in part on whether there is sufficient space for egress and ingress of passengers on only on a passenger side of the vehicle, only on a driver side of the vehicle, or on both the passenger side and the driver side of the vehicle.

Also in an exemplary embodiment, the processor is further configured to at least facilitate: identifying a plurality of lane markings for the parking location, using the sensor data; identifying one or more objects surrounding the vehicle, using the sensor data; calculating respective distances between the one or more objects and the lane markings, using the sensor data; and determining the offset based at least in part on the lane markings, the one or more objects surrounding the vehicle, and the respective distances between the one or more objects and the lane markings.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
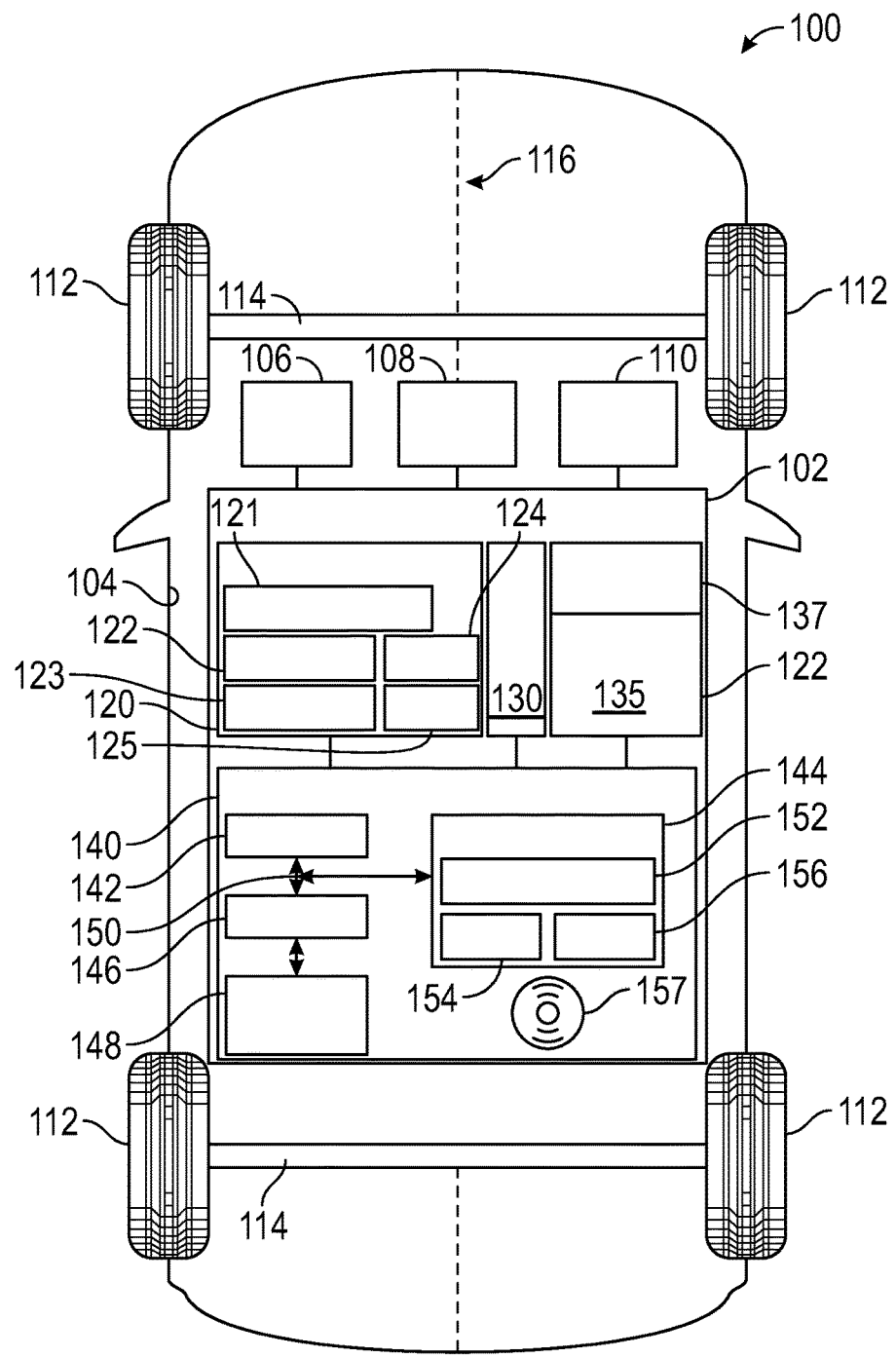
FIG. 1 is a functional block diagram of a vehicle having a control system for controlling alignment of vehicle parking, in accordance with exemplary embodiments.

FIG. 1 illustrates a vehicle 100. In various embodiments, and as described below, the vehicle 100 includes a control system 102 for controlling various functions of the vehicle 100, including alignment of parking of the vehicle 100 with automated or assisted parking of the vehicle 100. In various embodiments, the vehicle 100 may also be referred to herein as a "host vehicle" (e.g. as differentiation from additional vehicles, which also may be referenced as "other vehicles" or "surrounding", for example in nearby parking locations).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including parking) is automatically planned and executed by the control system 102, in whole or in part. In certain other embodiments, the vehicle 100 may be operated in whole or in part by a human driver, and in which the control system 102 may provide instructions, suggestions, or other assistance for the human driver for parking the vehicle 100. As described in greater detail further below (e.g., in accordance with FIG. 1 as well as FIGS. 2-12), in various embodiments the control system 102 provides automated or assisted parking for the vehicle 100 based on occupancy of the vehicle 100 (e.g., including specific locations in which the occupants are located inside the vehicle 100 in certain embodiments) as well as certain other factors in certain embodiments (e.g., that may include the location of nearby vehicles and/or other objects, and so on).

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions controlled automatically via the control system 102. In certain embodiments, the vehicle 100 comprises an autonomous vehicle, such as a semi-autonomous vehicle or a fully autonomous vehicle, for automated control of the drive system 110 and/or other vehicle components, including for parking of the vehicle 100 and alignment of the vehicle 100 for parking. However, this may vary in other embodiments, for example in which a human driver may control the drive system 110 and/or other vehicle components (e.g., in which the control system 102 may provide instructions, suggestions, or other assistance to the vehicle driver for recommended vehicle actions, including for parking of the vehicle 100 and alignment of the vehicle 100 for parking).

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102. In certain embodiments, the control system 102 controls automated parking for the vehicle 100 (including alignment of the vehicle 100 for parking) via automated control of the braking system 106 and/or steering system 108 and/or other vehicle components (such as the drive system 110, as described above). In certain other embodiments, the control system 102 provides assistance for parking for the vehicle 100 (including alignment of the vehicle 100 for parking) via instructions, suggestions, and/or other assistance for the driver of the vehicle 100.

In the embodiment depicted in FIG. 1, the control system 102 is coupled to the braking system 106, the steering system 108, and the drive system 110. Also as depicted in FIG. 1, in various embodiments, the control system 102 includes a sensor array 120, a location system 130, a transceiver 135, a display 137, and a controller 140.

In various embodiments, the sensor array 120 includes various sensors that obtain sensor data for controlling of parking of the vehicle 100, including alignment of the vehicle 100 for parking. In the depicted embodiment, the sensor array 120 includes one or more seat sensors 121, cameras 122, detection sensors 123, and input sensors 124. In certain embodiments, the sensor array 120 may also include one or more other sensors 125.

In certain embodiments, the seat sensors 121 obtain sensor data for detecting passengers occupying passenger seats inside the cabin of the vehicle 100. In certain embodiments, the seat sensors 121 include mass or weight sensors that are built into or coupled to respective seats of the vehicle 100. However, this may vary in other embodiments. Also in certain embodiments, each of the passenger seats may include or be coupled to one or more respective seat sensors 121. However, this may also vary in other embodiments.

In certain embodiments, the cameras 122 obtain sensor data for detecting passengers disposed inside the cabin of the vehicle 100. In certain embodiments, the cameras 122 detect a respective passenger seat in which each occupant of the vehicle 100 is currently located. However, this may also vary in other embodiments.

In various embodiments, the detection sensors 123 obtain sensor data for detecting various markers and obstacles outside the vehicle 100. For example, in certain embodiments, the detection sensors 123 detect parking spaces along with parking lines and/or other markers for the parking spaces, along with surrounding vehicles and/or other surrounding obstacles (e.g., trees, rocks, buildings, and so on). In various embodiments, the detection sensors 123 may include one or more cameras, radar, Lidar, sonar, infrared, and/or other one or more other types of detection sensors.

In various embodiments, the input sensors 124 obtain sensor data pertaining to user inputs from a driver or other occupant or user of the vehicle 100. In certain embodiments, the detected user inputs may include a driver's request for automated parking and/or for parking assistance. In certain other embodiments, the detected user inputs may also include a driver's inputs and/or engagement with respect to one or more other vehicle systems, such as the braking system 106 (e.g., via a brake pedal), the steering system 108 (e.g., via a steering wheel), and/or the drive system 110 (e.g., via an accelerator pedal).

Also in various embodiments, the location system 130 is configured to obtain and/or generate data as to a position and/or location in which the vehicle 100 is travelling and/or is about to park. In certain embodiments, the location system 130 comprises and/or or is coupled to a satellite-based network and/or system, such as a global positioning system (GPS) and/or other satellite-based system.

In certain embodiments, the vehicle 100 also includes a transceiver 135. In various embodiments, the transceiver 135 receives information regarding the location in which the vehicle 100 is about to park (e.g., via vehicle to vehicle or vehicle to infrastructure communications).

In various embodiments, the display 137 provides information or instructions for a driver and/or other occupants of the vehicle 100. In certain embodiments, the display 137 provides, among other possible information, instructions or recommendations for the driver as to how and/or where to park the vehicle 100. In certain embodiments, the display 137 may provide a visual description on a display screen as to the recommended alignment of the vehicle 100 for parking. In certain other embodiments, one or more audio, haptic, and/or other notifications may also be provided.

In various embodiments, the controller 140 is coupled to the sensor array 120, the location system 130, the transceiver 135, and the display 137. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 plans vehicle actions (including parking of the vehicle 100 and alignment of the vehicle 100 for parking) based on the sensor data obtained from the sensor array 120, and in certain embodiments from the location data obtained from the location system 130 (and, also in various embodiments, also from data obtained via the transceiver 135). In certain embodiments, the controller 140 automatically executes the planned vehicle parking, for example by automatically controlling vehicle actions such as via the braking system 106, steering system 108, and drive system 110. In certain other embodiments, the controller 140 provides instructions, recommendations, or other assistance via the display 137 for a human driver to execute the planned parking maneuver. In various embodiments, the controller 140 provides these and other functions in accordance with the steps of the processes and implementations depicted in FIGS. 2-12 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the processes and implementations depicted in FIGS. 2-12 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130 and/or transceiver 135 as to a parking location for the vehicle 100) and one or more stored values 156 (e.g., including, in various embodiments, threshold values and/or offsets with respect to aligning the vehicle 100 for parking).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the processes and implementations of FIGS. 2-12 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
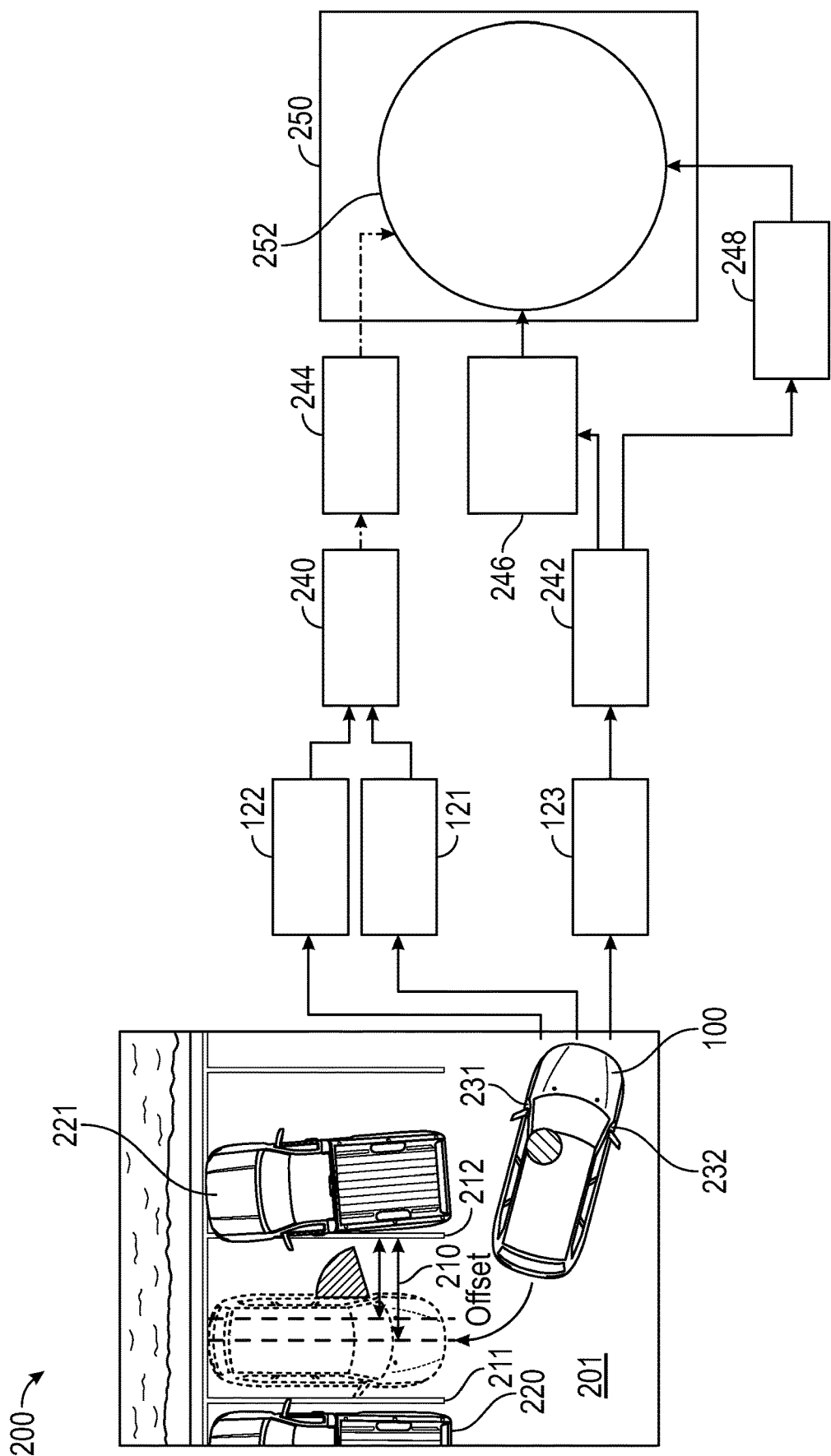
FIG. 2 is a structural flow diagram for a process for controlling alignment of vehicle during parking, and that can be implemented in connection with the vehicle of FIG. 1 and components thereof, in accordance with exemplary embodiments.

With reference to FIG. 2, a flowchart is provided of a process 200 for controlling alignment of vehicle parking, in accordance with exemplary embodiments. In various embodiments, the process 200 can be implemented in connection with the vehicle of FIG. 1 and components thereof. Also in various embodiments, the process 200 can also be implemented in connection with the various steps, processes, and implementations thereof as depicted in FIGS. 2-12 and as described further below in connection therewith.

As depicted in FIG. 2, the process 200 begins when a vehicle is approaching a parking location (e.g., either via autonomous driving or via a human driving the vehicle 100).

In one embodiment, the steps of the process 200 are performed continuously during parking of the vehicle.

As depicted in FIG. 2, in various embodiments, the vehicle 100 is disposed in or proximate a parking location 201 (e.g., a parking lot, or a parking space within a parking lot). As depicted in FIG. 1, the vehicle 100 includes one or more driver side doors 231 and passenger side doors 232. Also as depicted in FIG. 2, the vehicle 100 is being parked in a parking spot of the parking location 201 that is bounded between two parking lines 211, 212. In certain embodiments, other parking markers may also be utilized (e.g., cones, other markings, or the like). Also as depicted in FIG. 2, in various embodiments, the vehicle 100 (and the parking spot) are also in proximity to one or more surrounding vehicles 220, 221. In various embodiments, the process 200 determines a desired offset 210 from one or more of the surrounding vehicles 220, 221 (e.g., the offset 210 with respect to surrounding vehicle 221 as depicted in the exemplary embodiment of FIG. 2).

Also as depicted in FIG. 2, in various embodiments, sensor data is obtained via the seat sensors 121 and the in-cabin cameras 122 for occupant detection (step 240). In various embodiments, the occupants of the vehicle 100 (and their respective locations) are detected via the sensor data obtained via the seat sensors 121 and/or the in-cabin cameras 122.

Also in various embodiments, determinations are made as to which passenger seats of the vehicle 100 are occupied by passengers (step 244). In various embodiments, these determinations are made by the processor 142 of FIG. 1 based on the sensor data obtained via the seat sensors 121 and the in-cabin cameras 122 and based on the occupant detection of step 240 based thereon. Also in various embodiments, the determinations as to the occupied passenger seats are then utilized in the parking offset determination of step 250, described further below.

In addition, also as depicted in FIG. 2, in various embodiments, sensor data is obtained via the detection sensors 123 for perception determinations of the environment surrounding the vehicle 100 (step 242). In various embodiments, the processor 142 makes the perception determinations based on the sensor data from the detection sensors 123 (e.g., exterior cameras, radar, sonar, Lidar, infrared sensors, and the like).

Also in various embodiments, determinations are made as to detected parking spots (step 246) and detected obstructions (step 248). Specifically, in various embodiments, the processor 142 detects parking spots, including parking spot boundary lines or other markers, in step 246 based on the sensor data from the detection sensors 123 and the perception of step 242. In addition, in various embodiments, the processor 142 also detects surrounding vehicles, and other obstructions (e.g., including any trees, rocks, structures, or the like) in proximity to the parking space and/or the vehicle 100 in step 248 based on the sensor data from the detection sensors 123 and the perception of step 242. Also in various embodiments, the determinations as to the detected parking spots and the detected obstructions are then utilized in the parking offset determination of step 250, described directly below.

In various embodiments, the parking offset for the vehicle 100 is determined in step 250. Specifically, in various embodiments, the processor 142 determines an optimized offset for the vehicle 100 within the parking spot (e.g., as between the parking lines of the parking spot and/or as between the surrounding vehicles 221 and/or 221) based on the various determinations as to the seats occupied (step 244), the detected parking spots (step 246), and the detected obstructions (step 248).

In various embodiments, during step 250, the parking offset is determined by the processor 142 utilizing an optimized map based on geometry, including of the parking spot, the vehicle 100, and the surrounding vehicles 220 and/or 221 (and, for example, including any angles of the parking spots, surrounding vehicles, and so on). Also in various embodiments, as part of step 250, the processor 142 also determines which parking spots are available, as well as determining an optimal offset for parking the vehicle 100 into the desired parking spot.

In certain embodiments, during step 250, the desired offset refers to a deviation from a midpoint or center point (or center line) between two opposing markers for the parking spot (such as between the two parking lines 211, 212 in FIG. 2). In other embodiments, during step 250, the desired offset refers to a deviation from a midpoint or center point (or center line) between the vehicle 100 and one or more surrounding vehicles (such as one or both of the surrounding vehicles 220, 221 of FIG. 2).

In addition, in various embodiments (e.g., also as part of step 250), automated parking and/or parking assistance is provided based on the determined offset. For example, in certain embodiments, the processor 142 performs automated parking by providing instructions to the braking system 106, the steering system 108, the drive system 110, and/or other vehicle components in automatically parking the vehicle 100 in the desired parking spot with the desired offset. By way of further example, in certain other embodiments, the processor 142 performs parking assistance by providing instructions, recommendations, or other assistance to a human driver of the vehicle 100 (e.g., via the display 137 of FIG. 1) as to the desired parking spot with the desired offset.

Moreover, this disclosure includes various embodiments for steps and implementations of the step (or sub-process) 250, for example as set forth in FIGS. 3-12 and as described in greater detail below in connection therewith.

Figure 3:
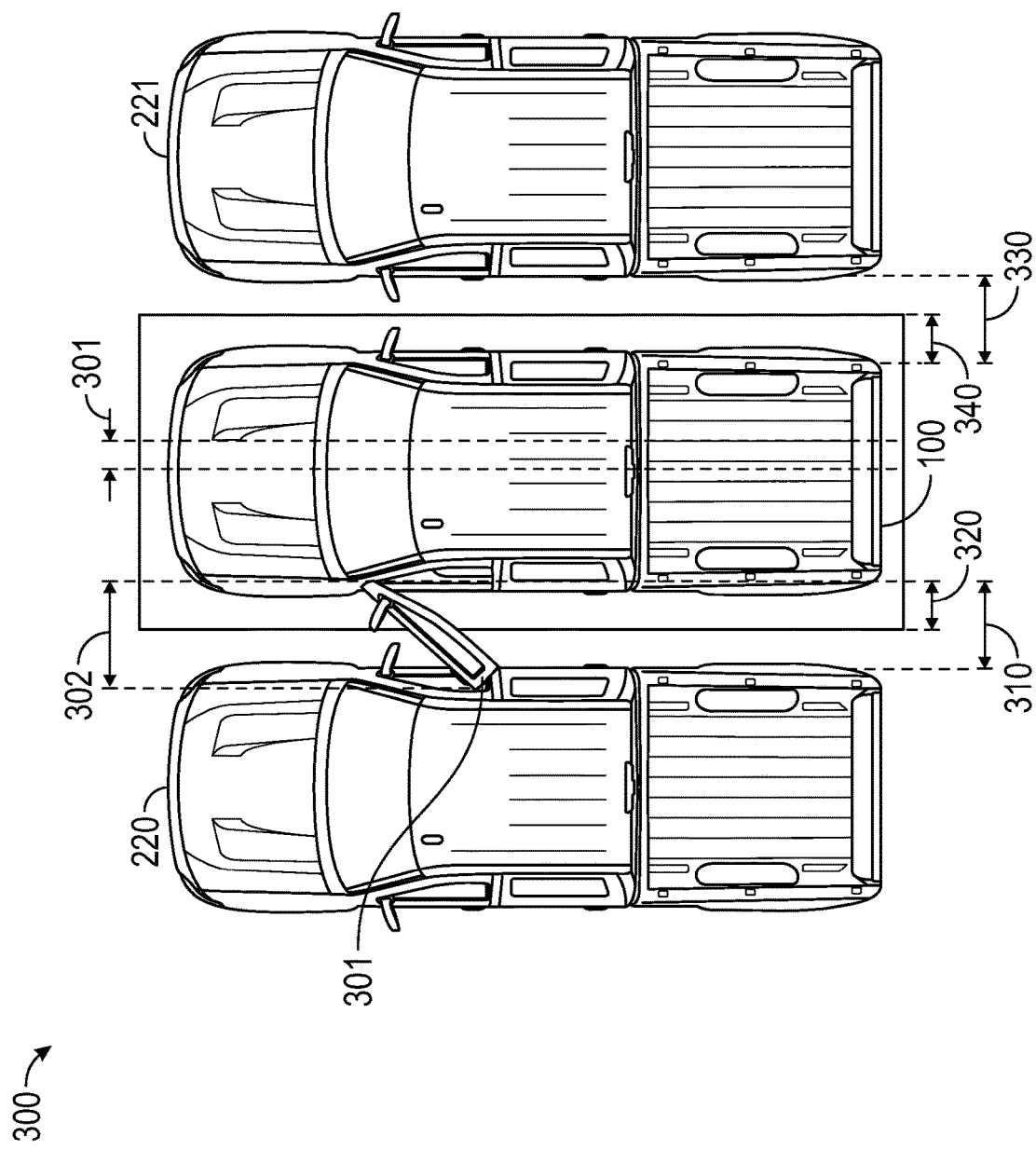
FIG. 3 depicts an implementation of the process of FIG. 2, depicting a parked vehicle in proximity to surrounding vehicles, including an offset pertaining thereto as calculated with respect to a particular point, in accordance with exemplary embodiments.

For example, FIG. 3 depicts an implementation of the process 200 of FIG. 2 in one exemplary embodiment of step 250, depicting a parked vehicle 100 in proximity to surrounding vehicles 220, including an offset 301 pertaining thereto as calculated at a particular point, in accordance with exemplary embodiments. As depicted in FIG. 3, in certain exemplary embodiments: "Offset" 301 refers to the offset for the vehicle 100 (e.g., between the surrounding vehicles 220, 221); "$W_{Door}$" 302 represents a width of a door of the vehicle 100 required to open the door fully for a passenger to egress from the vehicle 100; "$d_1$" 310 represents the distance from an obstacle (e.g., surrounding vehicle 220) to a driver side of the vehicle 100; "$d_2$" represents the distance from the nearest parking spot line to the driver side of the vehicle 100; "$d_3$" represents the distance from an obstacle (e.g., surrounding vehicle 221) to a passenger side of the vehicle 100; "$d_4$" represents the distance from the nearest parking spot line to the passenger side of the vehicle 100.

Figure 4:
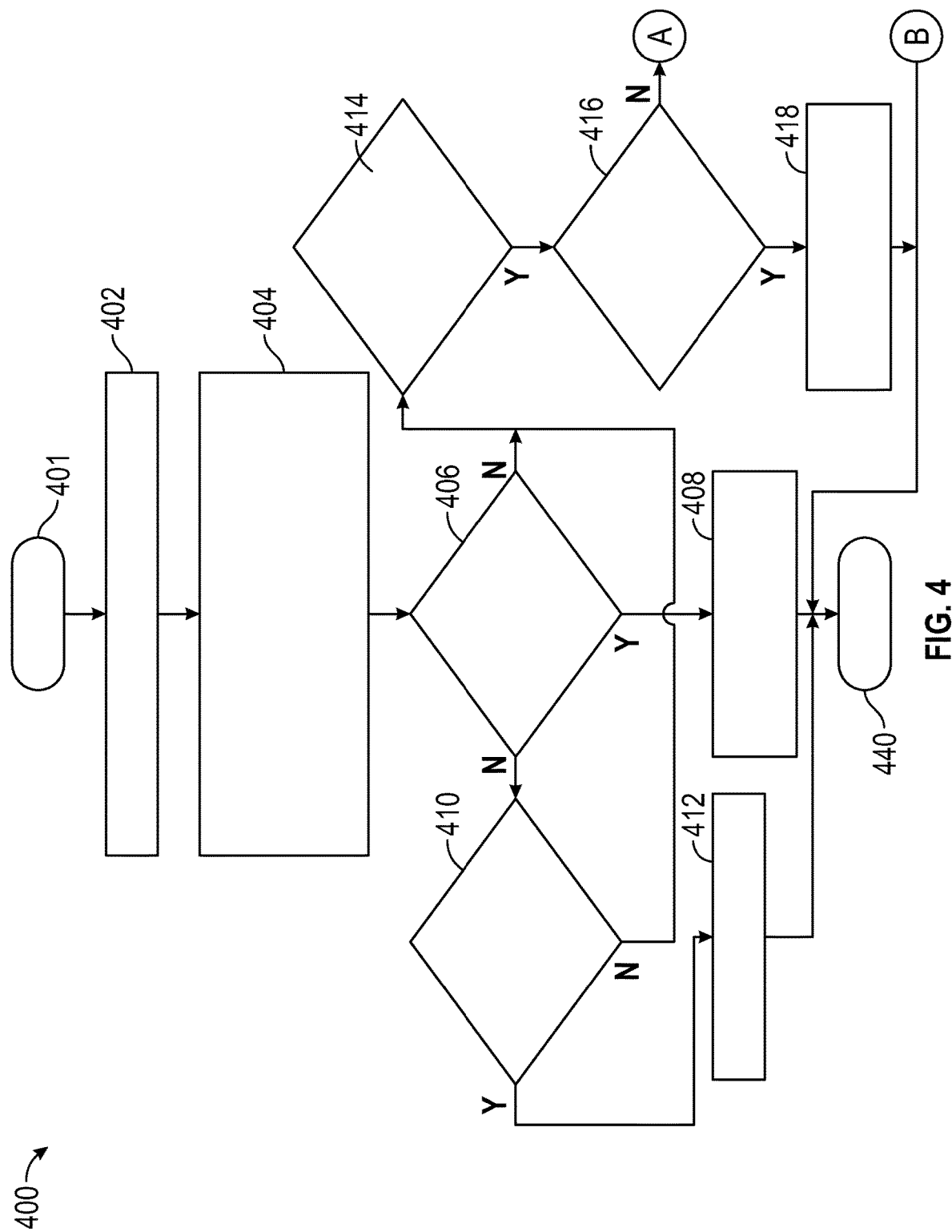
FIG. 4 is a flowchart of a process for a step of the process of FIG. 2, namely of determining the offset for the parking alignment for a particular point of interest, in accordance with exemplary embodiments.
Figure 4:
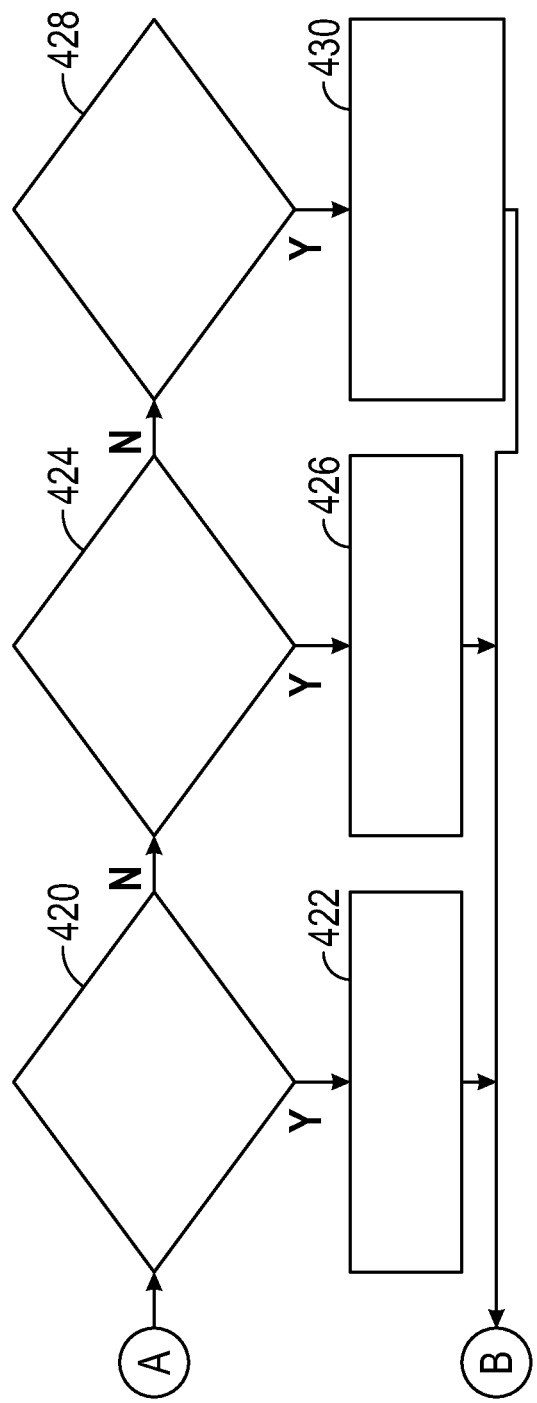

FIG. 4 is a flowchart of a process 400 for a step of the process 200 of FIG. 2, namely of determining the offset for the parking alignment for a particular point of interest during step 250, in accordance with exemplary embodiments. In various embodiments, the process 400 begins at step 401, for example as the vehicle 100 is being parked in accordance with the process 200 of FIG. 2 (and in particular with regard to the step 250 of FIG. 2).

In various embodiments, sensor data is obtained (step 402). In various embodiments, the sensor data comprises updated sensor data from the sensor array 120 of FIG. 1, including as to the location of occupants in the vehicle 100 and the detection of lane markings and obstacles with regard to the intended parking location for the vehicle 100.

In various embodiments, a driver space and a passenger space are calculated (step 404). In various embodiments, the driver space and the passenger space are calculated by the processor 142 of FIG. 1 based on the sensor data, as to when the vehicle 100 is (or would be) centered in the parking spot (i.e., when "$d_2$"="$d_4$"), in accordance with the following equations:

$$\text{Drive Space} = d_1 - W_{door} \qquad \text{(Equation 1); and}$$

$$\text{Passenger Space} = d_3 - W_{door} \qquad \text{(Equation 2).}$$

Also in various embodiments, a determination is made as to whether seat occupancy for the vehicle 100 is only on the driver side of the vehicle (step 406). In various embodiments, this determination is made by the processor 142 of FIG. 1 based on the sensor data.

In various embodiments, if it is determined in step 406 that the seat occupancy for the vehicle 100 is only on the driver side of the vehicle, then the process proceeds to step 408. In various embodiments, during step 408, the vehicle parking offset for the vehicle 100 is moved (or offset) to the passenger side as required for egress of the passenger(s) out the door(s) of the driver side of the vehicle 100. In various embodiments, the process 400 then terminates at step 440.

Conversely, in various embodiments, if it is instead determined in step 406 that the seat occupancy for the vehicle 100 is not only on the driver side of the vehicle, then the process proceeds instead to steps 410 and 414, both described separately below.

In various embodiments, during step 410, a determination is made as to whether seat occupancy for the vehicle 100 is only on the passenger side of the vehicle. In various embodiments, this determination is made by the processor 142 of FIG. 1 based on the sensor data. In certain embodiments, this determination is performed when the vehicle 100 comprises an autonomous vehicle.

In various embodiments, if it is determined in step 410 that the seat occupancy for the vehicle 100 is only on the passenger side of the vehicle, then the process proceeds to step 412. In various embodiments, during step 412, the vehicle parking offset for the vehicle 100 is moved (or offset) to the driver side as required for egress of the passenger(s) out the door(s) of the passenger side of the vehicle 100. In various embodiments, the process 400 then terminates at step 440.

Conversely, in various embodiments, if it is instead determined that the seat occupancy for the vehicle 100 is not only on the passenger side of the vehicle, then the process proceeds instead to step 414, described directly below.

In various embodiments, during step 414, a determination is made as to whether seat occupancy for the vehicle 100 is both on the driver side and on the passenger side of the vehicle. In various embodiments, this determination is made by the processor 142 of FIG. 1 based on the sensor data.

In various embodiments, if it is determined in step 414 that the seat occupancy for the vehicle 100 is both on the driver side and on the passenger side of the vehicle, then the process proceeds to step 416. In various embodiments, during step 416, a determination is made as to whether there is sufficient space (i.e., for passenger egress from the vehicle 100) on both sides of the vehicle 100 (i.e., the driver side and the passenger side of the vehicle). In various embodiments, this determination is made by the processor 142 of FIG. 1 based on the sensor data.

In various embodiments, if it is determined in step 416 that there is sufficient space on both the driver side and the passenger side of the vehicle 100, then the process proceeds to step 418. In various embodiments, during step 418, the offset is determined to be equal to zero "0", such that the vehicle 100 is parked midway between the respective lines of the parking spot (and the vehicle 100 is parked accordingly via automated parking or assisted parking). In various embodiments, the process then terminates at step 440.

Conversely, in various embodiments, if it is determined in step 416 that there is insufficient space on one or both of the driver side or the passenger side of the vehicle 100, then the process proceeds instead to step 420. In various embodiments, during step 420, a determination is made as to whether there is sufficient space for the vehicle 100 on the driver side only. In various embodiments, this determination is made by the processor 142 of FIG. 1 based on the sensor data.

In various embodiments, if it is determined in step 420 that there is sufficient space for the vehicle 100 on the driver side only, then the process proceeds to step 422. In various embodiments, during step 422, the offset is shifted to the driver side of the vehicle 100 (and the vehicle 100 is parked accordingly via automated parking or assisted parking). In various embodiments, the process then terminates at step 440.

Conversely, in various embodiments, if it is determined in step 420 that the condition of there being sufficient space on the driver side only is false, then the process proceeds instead to step 424. In various embodiments, during step 424, a determination is made as to whether there is sufficient space for the vehicle 100 on the passenger side only. In various embodiments, this determination is made by the processor 142 of FIG. 1 based on the sensor data.

In various embodiments, if it is determined in step 424 that there is sufficient space for the vehicle 100 on the passenger side only, then the process proceeds to step 426. In various embodiments, during step 426, the offset is shifted to the passenger side of the vehicle 100 (and the vehicle 100 is parked accordingly via automated parking or assisted parking). In various embodiments, the process then terminates at step 440.

Conversely, in various embodiments, if it is determined in step 424 that the condition of there being sufficient space on the passenger side only is false, then the process proceeds instead to step 428. In various embodiments, during step 428, a determination is made as to whether there is insufficient space for the vehicle 100 on both the driver side and the passenger side. In various embodiments, this determination is made by the processor 142 of FIG. 1 based on the sensor data.

In various embodiments, if it is determined in step 428 that there is insufficient space for the vehicle 100 on both the driver side and the passenger side, then the process proceeds to step 430. In various embodiments, during step 430, the offset is calculated such that the vehicle 100 is parked midway between the surrounding vehicles 220, 221, in accordance with the following equation:

$$\text{Offset} = (d_3 - d_1)/2 \qquad \text{(Equation 3).}$$

In various embodiments, the vehicle 100 is parked accordingly via automated parking or assisted parking. In various embodiments, the process then terminates at step 440.

Figure 5:
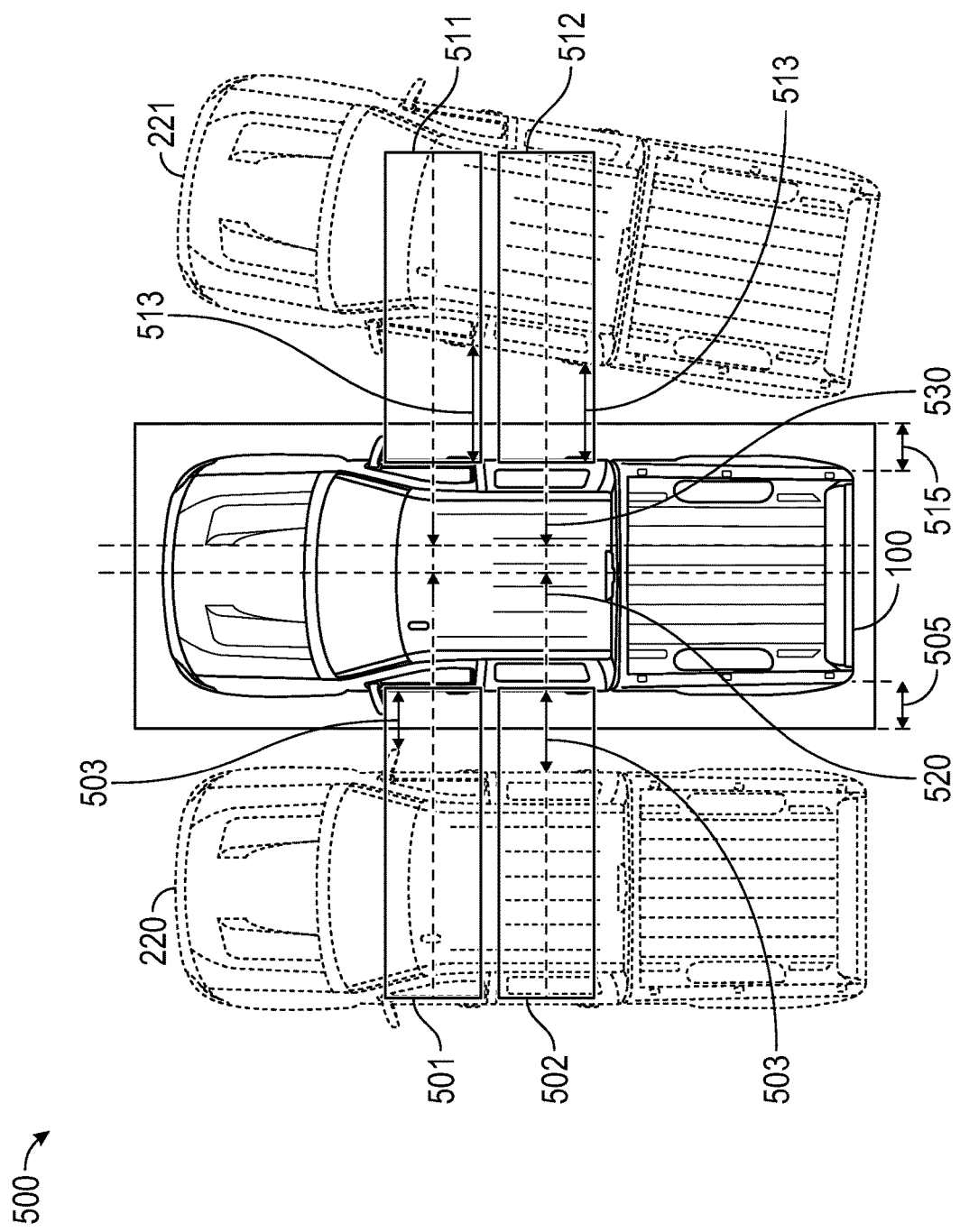
FIG. 5 depicts an implementation of the process of FIG. 4, depicting a parked vehicle in proximity to surrounding vehicles, including offsets pertaining thereto, in accordance with exemplary embodiments.

FIG. 5 depicts an implementation of the process 400 of FIG. 4, depicting a parked vehicle 100 in proximity to surrounding vehicles 220, 221, including offsets pertaining thereto, in accordance with exemplary embodiments. Specifically, as depicted in FIG. 5 in accordance with an exemplary embodiment, the vehicle 100 includes: a first left window (or first driver side window) 501; a second left window (or second driver side window) 502; a first right window (or first passenger side window) 511; and a second right window (or second passenger side window) 512.

Also as depicted in FIG. 5, in this exemplary embodiment, the selected distances $d_1$ 503 and $d_3$ 513 for a given point of interest comprise the minimum distance to the neighboring obstacles in a respective selected window. In the example of FIG. 5, these distances $d_1$ 503 and $d_3$ 513 are selected instead of other potential distances such as distance $d_2$ from the parking line to the driver side of the vehicle 100 or distance $d_4$ from the parking line to the passenger side of the vehicle 100. In the exemplary embodiment of FIG. 5, the selected distances $d_1$ 503 and $d_3$ 513 are utilized to calculate a first offset 520 ("Offset 1") with respect to a first surrounding vehicle (surrounding vehicle 220) along with a second offset 530 ("Offset 2") with respect to a second surrounding vehicle (surrounding vehicle 221).

Figure 6:
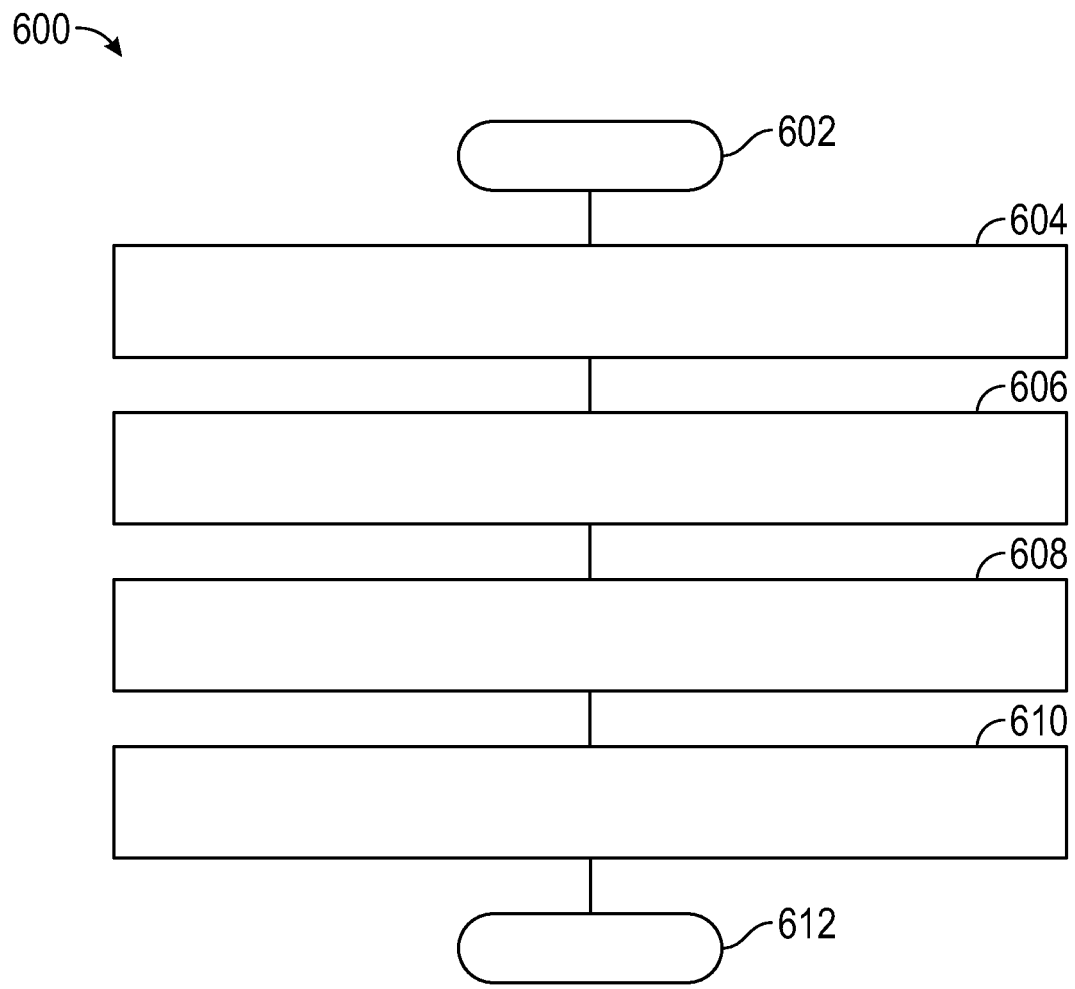
FIG. 6 is a flowchart of a process for a step of the process of FIG. 2, namely of determining multiple point offsets for the parking alignment, in accordance with exemplary embodiments.

FIG. 6 is a flowchart of a process 600 for a step of the process 200 of FIG. 2, namely of determining multiple point offsets for the parking alignment during step 250, in accordance with exemplary embodiments. In various embodiments, the process 600 begins at step 602, for example as the vehicle 100 is being parked in accordance with the process 200 of FIG. 2 (and in particular with regard to the step 250 of FIG. 2).

In various embodiments, one or more points (e.g., P1 and P2) are selected at which the parking offset is to be applied (step 604). In certain embodiments, by default two points are selected to apply the offset; namely: "P1" representing the longitudinal center of the front doors of the vehicle 100; and "P2" representing the longitudinal center of the rear doors of the vehicle 100. In certain other embodiments, other points may be selected instead, such as (by way of example): the front and rear of the passenger cabin of the vehicle; the front and rear of the body of the vehicle 100; or the longitudinal end of the front and/or rear doors, and so on. Also in certain embodiments a single point may be selected, and/or three or more points may be selected (instead of the two points described herein). In various embodiments, the points are selected by the processor 142 of FIG. 1 and/or retrieved from the memory 144 of FIG. 1 (as stored values 156 thereof). Also in various embodiments, the points are selected so as to help ensure that a minimum distance is maintained between the vehicle 100 and any surrounding vehicles or other objects.

In various embodiments, during step 606, the comfort score algorithm is utilized in connection with the following generalized equation:

$$Score_{Comfort} = K_{driver}(Score_{marginToOpenDriverSideDoors}) + K_{passenger}(Score_{marginToOpenPassengerSideDoors}) + K_{straightness}(Score_{varianceInOffsetOfPoints})$$ (Equation 4)

In addition, in certain embodiments, during step 606, the comfort score algorithm is utilized in connection with the following specific equation:

$$Score_{Comfort} = K_{straightness}(Score_{varianceInOffsetOfPoints}) + K_{driver}(\Sigma_{Driver\ Side\ Doors} e^{-1 \times K_{comfort} \times (W_{door} - d_{toObstacle})}) + K_{passenger}(\Sigma_{Passenger\ Side\ Doors} e^{-1 \times K_{comfort} \times (W_{door} - d_{toObstacle})})$$ (Equation 5).

Also in various embodiments, the comfort score is optimized (step 608). In various embodiments, the comfort score is optimized by the processor 142 over the range of combinations of offsets. Also in various embodiments, the combinations are based on the maximum and minimum offsets at each point, as well as any applicable constraints pertaining to the parking lines and/or obstacles (e.g., surrounding vehicles).

In various embodiments, selected offsets are provided (step 610). Specifically, in various embodiments, the selected offsets are provided for parking the vehicle 100 in accordance with automated parking and/or assisted parking (e.g., via an assisted/automated parking mission planning algorithm executed by the processor 142).

In various embodiments, the process 600 then terminates at step 612.

Figure 7:
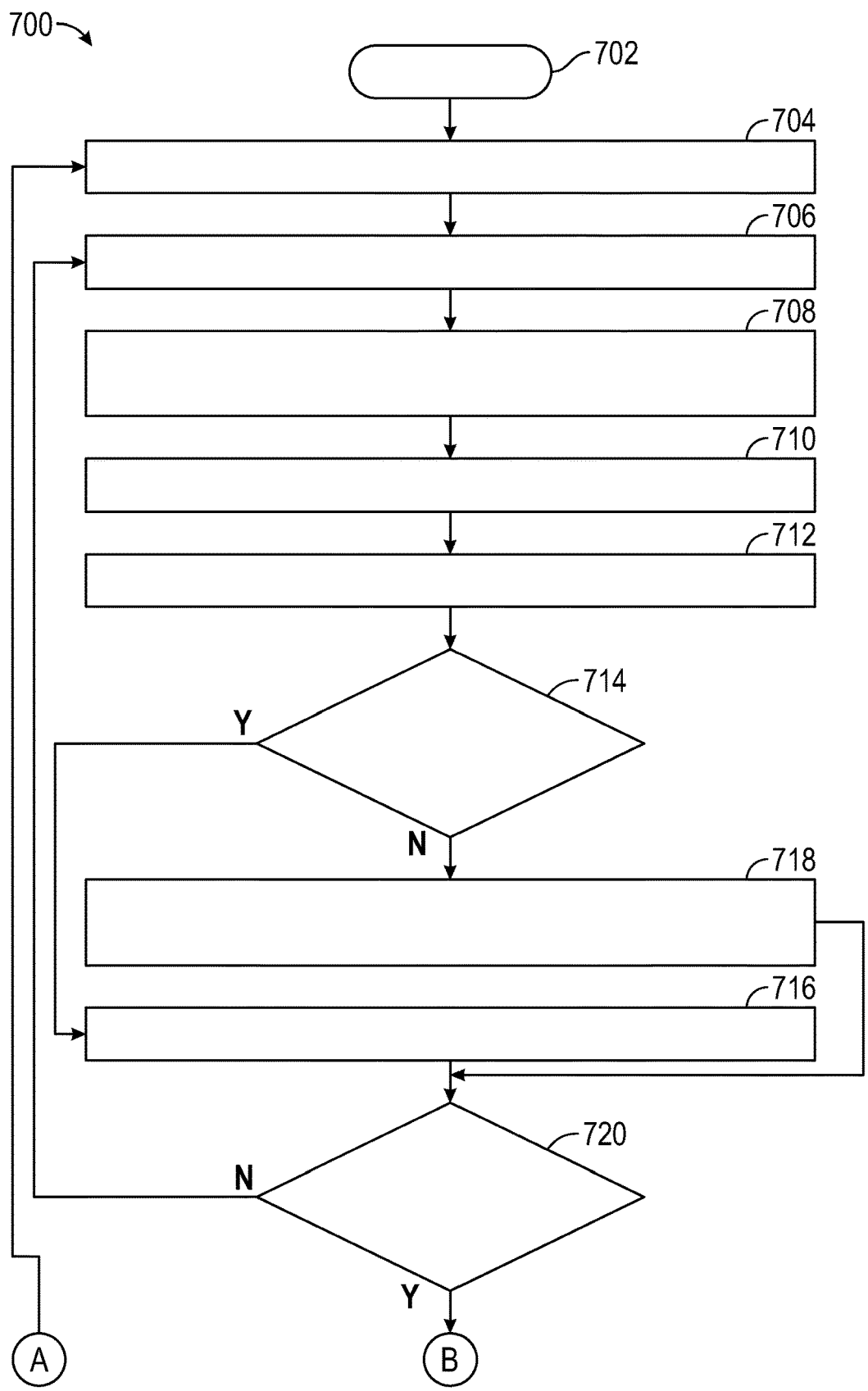
FIG. 7 is a flowchart of a process for a step of the process of FIG. 2, namely of determining offset optimization for the parking alignment, in accordance with exemplary embodiments.
Figure 7:
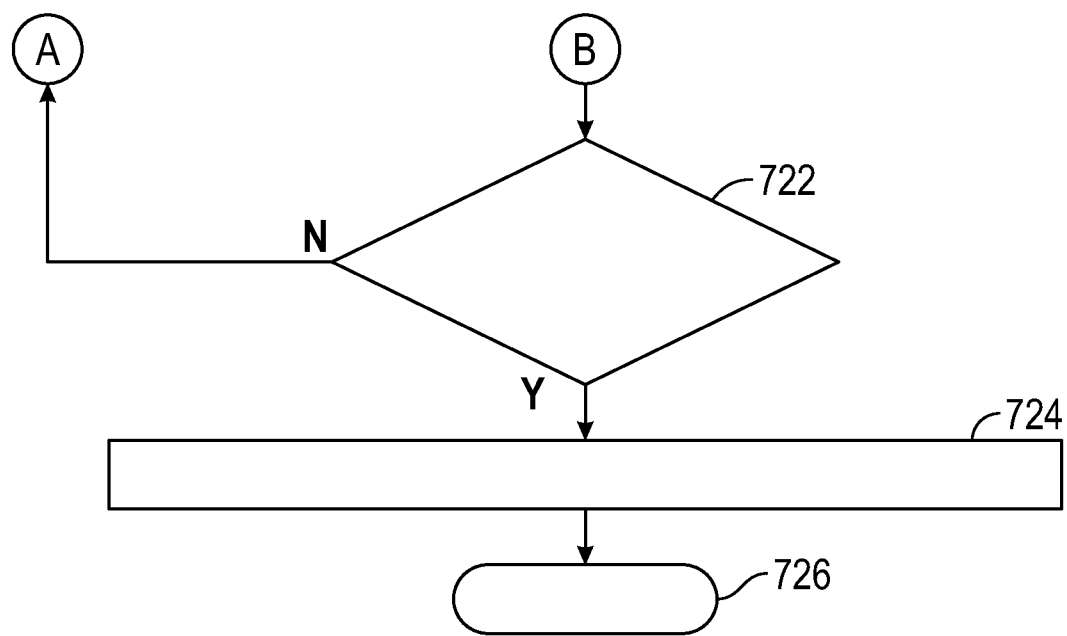

FIG. 7 is a flowchart of a process 700 for a step of the process of FIG. 2, namely of determining offset optimization for the parking alignment during step 250, in accordance with exemplary embodiments. In various embodiments, the process 700 begins at step 702, for example as the vehicle 100 is being parked in accordance with the process 200 of FIG. 2 (and in particular with regard to the step 250 of FIG. 2).

As depicted in FIG. 7, in various embodiments, the optimization method is applied for the range of the maximum and minimum offsets for a first selected point (P1) (step 704), and is also applied for the range of the maximum and minimum offsets for a second selected point (P2) (step 706). In various embodiments, the maximum and minimum offsets for the ranges are based on minimum distances required between the vehicle 100 and parking lines and/or other vehicles (e.g., surrounding vehicles), for example to allow safe movement of the vehicle 100 and surrounding vehicles and to allow safe egress and ingress of passengers of the vehicle 100 and surrounding vehicles out of and back into the respective vehicles. Also in various embodiments, for the process 700 of FIG. 7, the iteration size may be calibratable, and may vary for example based on the optimization method.

In various embodiments, the offset for the second point P2 is updated (step 708). In various embodiments, the offset for the second point P2 is updated by the processor 142 of FIG. 1 to ensure that the vehicle 100 does not violate an applicable constraint pertaining to the parking lines and/or obstacles (e.g., surrounding vehicles).

Also in various embodiments, the offsets are applied at both points P1 and P2 (step 710). In various embodiments, this is performed by the processor 142 of FIG. 1.

Also in various embodiments, the comfort score is calculated (step 712). In various embodiments, this is performed by the processor 142 of FIG. 1 in accordance with the steps and equations described above in connection with FIG. 6.

In various embodiments, a determination is made as to whether the comfort score is less than a selected comfort score (step 714). In certain embodiments, the selected comfort score comprises a prior comfort score value, for example during prior calculations and/or as selected by a user (e.g., driver or passenger) of the vehicle 100. Also in various embodiments, the determination of step 714 is made by the processor 142 of FIG. 1.

In various embodiments, if it is determined in step 714 that the comfort score is less than the selected comfort score, then the process proceeds to step 716. In various embodiments, during step 716, the selected offsets and selected comfort score are set. In various embodiments, this is performed by the processor 142 of FIG. 1 using the current respective values of the selected offsets. In various embodiments, the process then proceeds to step 720, described further below.

Conversely, in various embodiments, if it is instead determined in step 714 that the comfort score is greater than or equal to the selected comfort score, then the process proceeds instead to step 718. In various embodiments, during step 718, the previous selected offsets and selected comfort score are kept. In various embodiments, this is performed by the processor 142 of FIG. 1. In various embodiments, the process then proceeds to step 720, described directly below.

During step 720, in various embodiments, a determination is made as to whether the iteration over the range of P2 is complete. In various embodiments, this determination is made by the processor 142 of FIG. 1.

In various embodiments, if it is determined in step 720 that the iteration over the range of P2 is not complete, then the process returns to step 706, and steps 706-720 thereafter repeat in new iterations until the iteration over the range of P2 is complete.

In various embodiments, once it is determined in an iteration of step 720 that the iteration over the range of P2 is complete, then the process proceeds to step 722. During step 722, in various embodiments, a determination is made as to whether the iteration over the range of P1 is complete. In various embodiments, this determination is made by the processor 142 of FIG. 1.

In various embodiments, if it is determined in step 722 that the iteration over the range of P1 is not complete, then the process returns to step 704, and steps 704-722 thereafter repeat in new iterations until the iteration over the range of P1 is complete.

In various embodiments, once it is determined in an iteration of step 722 that the iteration over the range of P1 is complete, then the process proceeds to step 724. In various embodiments, during step 724, the selected offsets and selected comfort score are returned. In various embodiments, the processor 142 of FIG. 1 provides the selected offsets and the selected comfort score for use in parking the vehicle 100 via automated or assisted parking.

In various embodiments, the process 700 then terminates at step 726.

Figure 8:
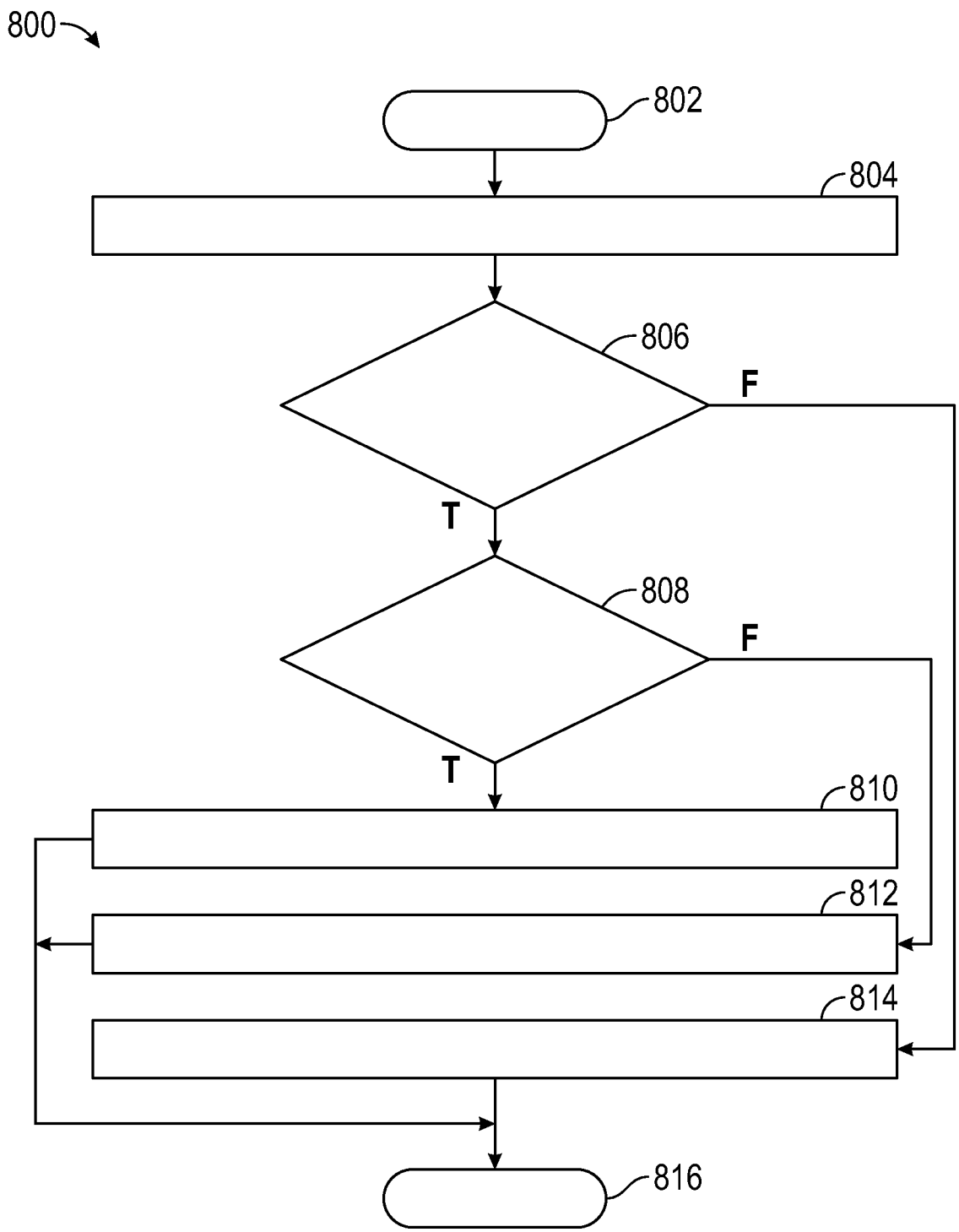
FIG. 8 is a flowchart of a process for a step of the process of FIG. 2, namely of determining desired and allowable offsets for the parking alignment, in accordance with exemplary embodiments.

FIG. 8 is a flowchart of a process 800 for a step of the process of FIG. 2, namely of determining desired and allowable offsets for the parking alignment during step 250, in accordance with exemplary embodiments. In various embodiments, the process 800 begins at step 802, for example as the vehicle 100 is being parked in accordance with the process 200 of FIG. 2 (and in particular with regard to the step 250 of FIG. 2).

In various embodiments, the desired offsets and allowable offset are calculated (step 804). In various embodiments, these values are calculated by the processor 142 of FIG. 1, for example as described in greater detail above in connection with the processes and implementations of FIGS. 2-7. In certain embodiments, the desired offsets comprise optimized offsets between the vehicle 100 and parking lines and/or other vehicles or objects to allow ease of passenger egress out of and ingress to the vehicle 100, whereas the allowable offsets comprise minimize distances between the vehicle 100 and the parking lines and/or other vehicles or objects.

Also in various embodiments, a determination is made as to whether the desired offset is greater than zero (step 806). In various embodiments, this determination is made by the processor 142 of FIG. 1.

In various embodiments, if it is determined in step 806 that the desired offset is greater than zero, then the process proceeds to step 808. During step 808, a determination is made as to whether the desired offset is less than the allowable offset. In various embodiments, this determination is made by the processor 142 of FIG. 1.

If it is determined in step 808 that the desired offset is less than the allowable offset, then the process proceeds to step 810. During step 810, the parking offset for the vehicle 100 is set equal to the desired offset. In various embodiments, this is performed by the processor 142, and parking of the vehicle 100 is facilitated thereby via automated and/or assisted parking for the vehicle 100 in accordance with instructions provided by the processor 142. In various embodiments, the process then terminates at step 816.

Conversely, if it is instead determined in step 808 that the desired offset is greater than or equal to the allowable offset, then the process proceeds instead to step 812. During step 812, the parking offset for the vehicle 100 is set equal to the allowable offset. In various embodiments, this is performed by the processor 142, and parking of the vehicle 100 is facilitated thereby via automated and/or assisted parking for the vehicle 100 in accordance with instructions provided by the processor 142. In various embodiments, the process then terminates at step 816.

With reference back to step 806, if it is instead determined in step 806 that the desired offset is less than or equal to zero, then the process proceeds instead to step 814. During step 814, the parking offset for the vehicle 100 is set equal to zero. In various embodiments, this is performed by the processor 142, and parking of the vehicle 100 is facilitated thereby via automated and/or assisted parking for the vehicle 100 in accordance with instructions provided by the processor 142. In various embodiments, the process then terminates at step 816.

FIGS. 9-12 depict implementations of the processes described above (including the process 400 of FIG. 4), including offsets for a parked vehicle in proximity to surrounding vehicles under different scenarios, in accordance with exemplary embodiments.

Figure 9:
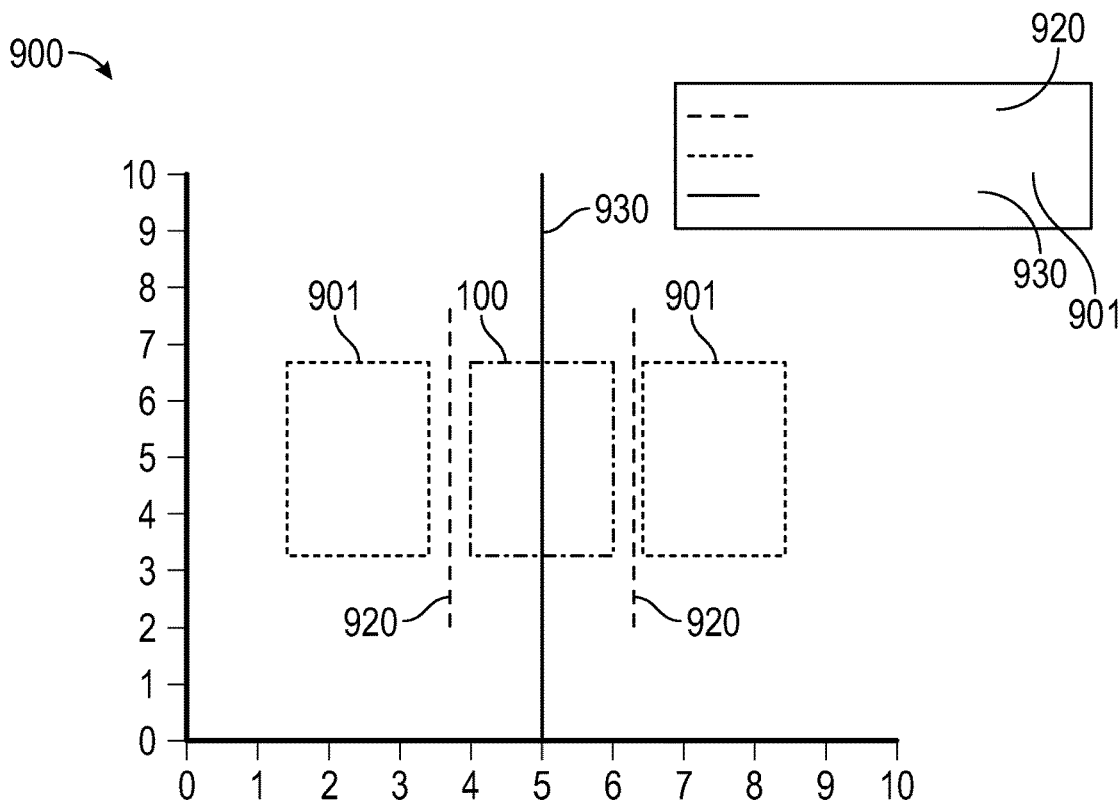
FIGS. 9-12 depict implementations of the process of FIG. 4, including offsets for a parked vehicle in proximity to surrounding vehicles under different scenarios, in accordance with exemplary embodiments.

First, FIG. 9 depicts a first implementation 900 in which the vehicle 100 is occupied only on the driver side (e.g., corresponding to step 406 and 408 of FIG. 4), and there are surrounding vehicles 901 on both sides of the parking spot that are both equidistant from the desired parking spot for the vehicle 100, in accordance with an exemplary embodiment. As depicted in FIG. 9, in this implementation 900, the offset 930 of the vehicle 100 is equal to zero. Specifically, in an exemplary embodiment, as depicted in FIG. 9, the parking of the vehicle 100 is in the middle, between parking lines 920 of the parking spot. Also as depicted in FIG. 9, this provides room between the vehicle 100 and surrounding vehicles 901, for example for movement of the vehicles and passenger egress and ingress.

Figure 10:
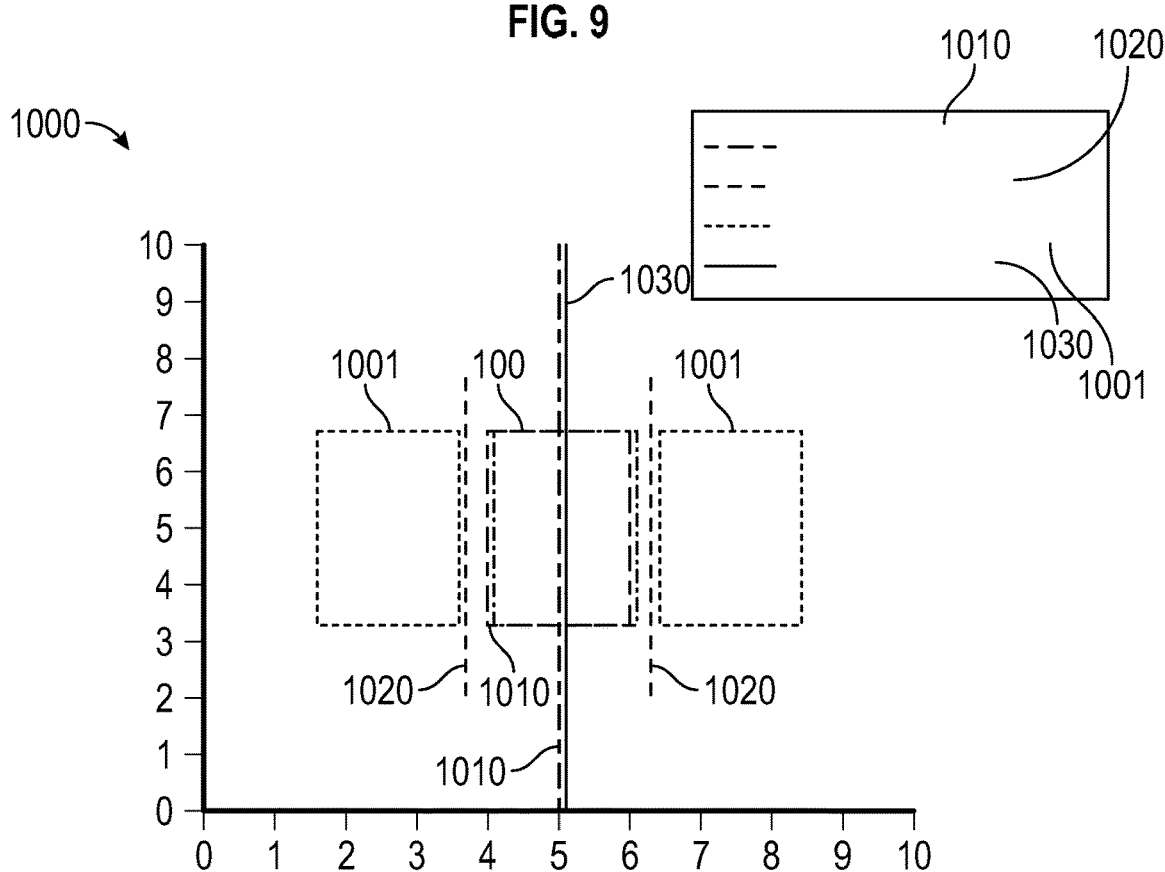

Next, FIG. 10 depicts a second implementation 1000 in which the vehicle 100 is occupied only the driver side (e.g., corresponding to step 406 and 408 of FIG. 4), and there are surrounding vehicles 901 on both sides of the parking spot that are not equidistant from the desired parking spot for the vehicle 100, in accordance with an exemplary embodiment. As depicted in FIG. 10, in this implementation 1000, the offset 1030 of the vehicle 100 is relatively small (e.g., as compared with the implementation of FIG. 12, described further below), and is applied to the passenger side of the vehicle 100. For example, the offset may be equal to a value of +0.1 in one embodiment. Specifically, in an exemplary embodiment, as depicted in FIG. 10, the parking of the vehicle 100 is provided in accordance with the offset target 1030, which is shifted slightly to the passenger side of the original target 1010 (e.g., offset with respect to a midpoint) between parking lines 1020 of the parking spot. Also as depicted in FIG. 10, this still provides room between the vehicle 100 and surrounding vehicles 1001, for example for movement of the vehicles and passenger egress and ingress.

Figure 11:
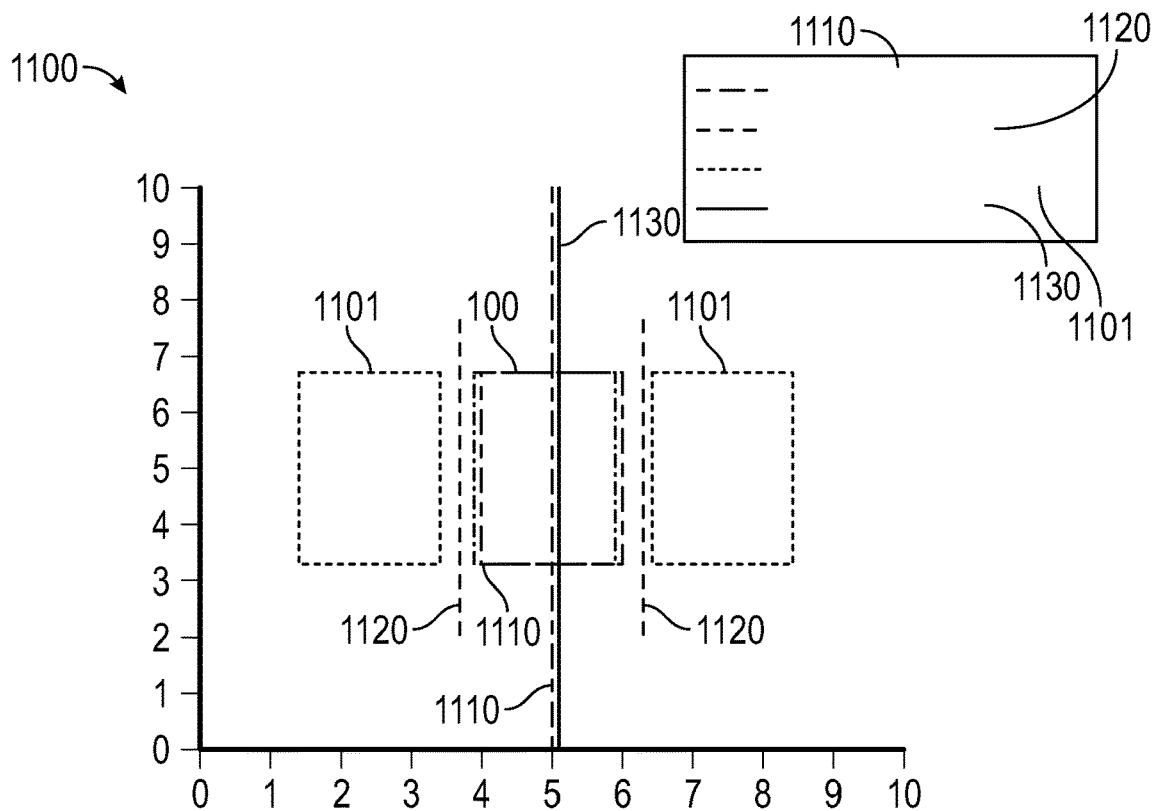

Next, FIG. 11 depicts a third implementation 1100 in which the vehicle 100 is occupied on both the driver side and the passenger side, and in which there are surrounding vehicles 1101 on both sides of the parking spot such that there is sufficient space on the driver side only of the vehicle 100. In various embodiments, this corresponds to the scenario of steps 420 and 422 of FIG. 4, as described above. As depicted in FIG. 11, in this implementation 1100, the offset 1130 of the vehicle 100 is relatively small (e.g., similar to the magnitude of the implementation of FIG. 10, but in an opposite direction), and is applied to the driver side of the vehicle 100. For example, the offset may be equal to a value of −0.1 in one embodiment. Specifically, in an exemplary embodiment, as depicted in FIG. 11, the parking of the vehicle 100 is provided in accordance with the offset target 1130, which is shifted slightly to the driver side of the original target 1110 (e.g., offset with respect to a midpoint) between parking lines 1120 of the parking spot. Also as depicted in FIG. 11, this still provides room between the vehicle 100 and surrounding vehicles 1101, for example for movement of the vehicles and passenger egress and ingress.

Figure 12:
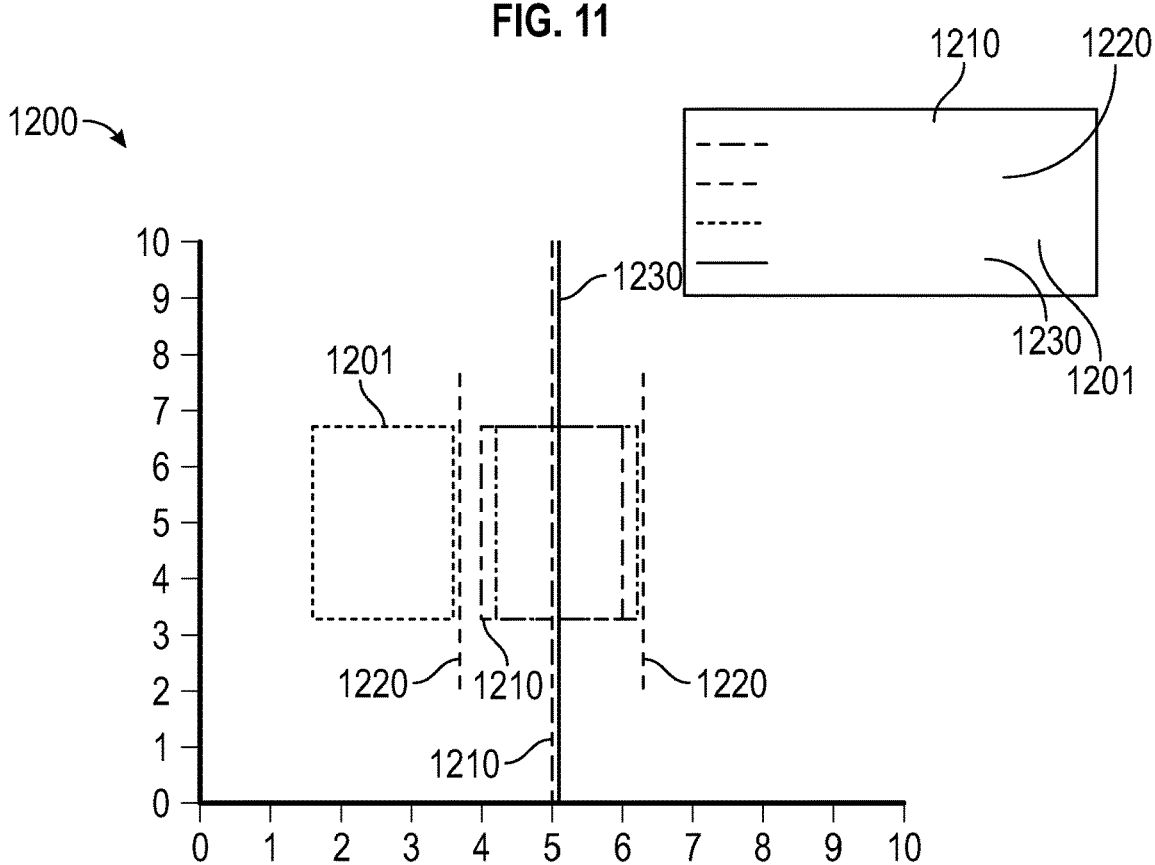

Finally, FIG. 12 depicts a fourth implementation 1200 in which the vehicle 100 is occupied on both the driver side and the passenger side, and in which there is a surrounding vehicle 1201 on the driver side of the parking spot such that there is sufficient space on the passenger side only of the vehicle 100. In various embodiments, this corresponds to the scenario of steps 424 and 426 of FIG. 4, as described above. As depicted in FIG. 12, in this implementation 1200, the offset 1230 of the vehicle 100 is relatively larger (e.g., as compared with the respective offsets of FIGS. 10 and 11), and is applied to the passenger side of the vehicle 100. For example, the offset may be equal to a value of +0.2 in one embodiment. Specifically, in an exemplary embodiment, as depicted in FIG. 12, the parking of the vehicle 100 is provided in accordance with the offset target 1130, which is shifted somewhat to the passenger side of the original target 1210 (e.g., offset with respect to a midpoint) between parking lines 1220 of the parking spot. Also as depicted in FIG. 12, this still provides room between the vehicle 100 and surrounding vehicle 1201, for example for movement of the vehicles and passenger egress and ingress.

While FIGS. 9-12 depict certain exemplary implementations of the methods and processes described herein, it will be appreciated that a number of different implementations may also be utilized, for example corresponding to various conditions regarding the parking environment for the vehicle 100. For example, in various embodiments, the parking spot and/or parking lot in general may involve skewed, angle, and/or irregular parking for the vehicle 100 and/or for surrounding vehicles. Such conditions and/or circumstances may result in different optimized offsets and alignment for parking of the vehicle 100 such as, by way of example, skewed, angled, and/or irregular offsets for parking the vehicle 100, and/or multiple offsets (e.g., different offsets respect to difference respective distances from different parts of the vehicle 100 and/or to different parts of surrounding vehicles), and so on, among other possible variations in different embodiments.

Accordingly, methods, systems, and vehicles are provided for determining and executing an offset for parking of a vehicle in automated or assisted parking for the vehicle. In various embodiments, the parking offset is determined based on occupancy of the vehicle, including specific passenger seats that are presently occupied by passengers of the vehicle. Also in certain embodiments, the parking offset may also be determined using detected surrounding vehicles and/or other objects, among other possible factors.

In various embodiments, the techniques described herein may be used in connection with vehicles having a human driver, but that also have automatic functionality (e.g., automated parking and/or assisted parking). In various embodiments, the techniques described herein may also be used in connection autonomous vehicles, such as semi-autonomous and/or fully autonomous vehicles.

It will be appreciated that the systems, vehicles, and methods may vary from those depicted in the Figures and described herein. For example, the vehicle 100 of FIG. 1 and/or components thereof may differ from that depicted in FIG. 1. It will similarly be appreciated that the steps of the processes and implementations of FIGS. 2-12 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling alignment of a vehicle during parking, comprising:
    obtaining sensor data via one or more sensors of the vehicle, as to passenger occupancy of the vehicle and as to a parking location for the vehicle, including via in-cabin cameras, seat sensors, and detection sensors of the vehicle;
    identifying, via a processor of the vehicle, which passenger seats of the vehicle are occupied by occupants, based on the sensor data, including from the in-cabin cameras and the seat sensors;
    identifying, via the processor, the parking location based on the sensor data, including from the detection sensors; and
    determining, via the processor, an offset for parking of the vehicle in the parking location, based at least in part on which passenger seats of the vehicle are occupied by occupants, including by, via the processor:
        determining respective distances between both a driver side of the vehicle and a passenger side of the vehicle with respect to other vehicles, other objects, and parking lines in proximity to the vehicle and the parking location;
        determining, based on the respective distances, whether parking in a center of the parking location would impair driver side occupants from exiting the vehicle without contacting one or more of the other vehicles or other objects;

determining, based on the respective distances, whether parking in the center of the parking location would impair passenger side occupants from exiting the vehicle without contacting one or more of the other vehicles or other objects;

shifting the offset from the center toward the passenger side when it is determined by the processor that parking in the center of the parking location would impair driver side occupants, but not passenger side occupants, from exiting the vehicle without contacting one or more of the other vehicles or other objects;

shifting the offset from the center toward the driver side when it is determined by the processor that parking in the center of the parking location would impair passenger side occupants, but not driver side occupants, from exiting the vehicle without contacting one or more of the other vehicles or other objects;

maintaining the offset in the center of the parking location when it is determined by the processor that parking in the center of the parking location would impair both driver side occupants and rear side occupants from exiting the vehicle without contacting one or more of the other vehicles or other objects; and maintaining the offset in the center of the parking location when it is determined by the processor that parking in the center of the parking location would impair neither the driver side occupants nor the rear side occupants from exiting the vehicle without contacting one or more of the other vehicles or other objects; and taking a vehicle control action, in accordance with instructions provided by the processor, based on the determined offset for parking of the vehicle in the parking location;

wherein the offset is determined via the processor further based on one or more comfort scores that are calculated by the processor based on positions of each of a plurality of doors of the vehicle, including a front driver side door, a front passenger side door, a rear driver side door, and a rear passenger side door, with respect to one or more other vehicles, other objects, and lane markings in proximity to the vehicle and the parking location.

2. The method of claim 1, further comprising:
automatically parking the vehicle in the parking location using the offset, via instructions provided by the processor based on the offset as determined by the processor.

3. The method of claim 1, further comprising:
performing assistance for a human for parking the vehicle in the parking location using the offset, via instructions provided by the processor as presented to a human driver via a display of the vehicle based on the offset as determined by the processor.

4. The method of claim 1, wherein the step of determining the offset comprises determining, via the processor, the offset based at least in part on which occupants are disposed only in a passenger side of the vehicle, only in a driver side of the vehicle, or both the passenger side and the driver side of the vehicle.

5. The method of claim 1, wherein the one or more comfort scores are determined via the processor based on application of the offset to a plurality of points of the vehicle, including a longitudinal center of the front doors of the vehicle and a longitudinal center of the rear doors of the vehicle, and wherein the plurality of points are selected by the processor in a manner that ensures that at least a predetermined minimum distance is maintained between the vehicle, including the predetermined points of the vehicle, and the other vehicles and other objects in proximity to the vehicle.

6. A system for controlling alignment of a vehicle during parking, comprising:
one or more sensors of the vehicle, including in-cabin cameras, seat sensors, and detection sensors of the vehicle, that are configured for obtaining sensor as to passenger occupancy of the vehicle and as to a parking location for the vehicle; and a processor that is coupled to the sensor data and that is configured to at least facilitate:
identifying which passenger seats of the vehicle are occupied by occupants, based on the sensor data, including from the in-cabin cameras and the seat sensors;

identifying the parking location based on the sensor data, including from the detection sensors; and determining an offset for parking of the vehicle in the parking location, based at least in part on which passenger seats of the vehicle are occupied by occupants, including by:
determining respective distances between both a driver side of the vehicle and a passenger side of the vehicle with respect to other vehicles, other objects, and parking lines in proximity to the vehicle and the parking location;

determining, based on the respective distances, whether parking in a center of the parking location would impair driver side occupants from exiting the vehicle without contacting one or more of the other vehicles or other objects;

determining, based on the respective distances, whether parking in the center of the parking location would impair passenger side occupants from exiting the vehicle without contacting one or more of the other vehicles or other objects;

shifting the offset from the center toward the passenger side when it is determined by the processor that parking in the center of the parking location would impair driver side occupants, but not passenger side occupants, from exiting the vehicle without contacting one or more of the other vehicles or other objects;

shifting the offset from the center toward the driver side when it is determined by the processor that parking in the center of the parking location would impair passenger side occupants, but not driver side occupants, from exiting the vehicle without contacting one or more of the other vehicles or other objects;

maintaining the offset in the center of the parking location when it is determined by the processor that parking in the center of the parking location would impair both driver side occupants and rear side occupants from exiting the vehicle without contacting one or more of the other vehicles or other objects; and maintaining the offset in the center of the parking location when it is determined by the processor that parking in the center of the parking location would impair n either the driver side occupants nor the rear side occupants from exiting the vehicle without contacting one or more of the other vehicles or other objects; and taking a vehicle control action, in accordance with instructions provided by the processor, based on the determined offset for parking of the vehicle in the parking location;

wherein the processor is configured to determine the offset further based on one or more comfort scores that are calculated by the processor based on positions of each of a plurality of doors of the vehicle, including a front driver side door, a front passenger side door, a rear driver side door, and a rear passenger side door, with respect to one or more other vehicles, other objects, and lane markings in proximity to the vehicle and the parking location.

7. The system of claim 6, wherein the processor is further configured to at least facilitate automatically parking the vehicle in the parking location using the offset.

8. The system of claim 6, wherein the processor is further configured to at least facilitate performing assistance for a human for parking the vehicle in the parking location using the offset, via the instructions provided by the processor as presented to a human driver via a display of the vehicle.

9. The system of claim 6, wherein the processor is further configured to at least facilitate determining the offset based at least in part on which occupants are disposed only in a passenger side of the vehicle, only in a driver side of the vehicle, or both the passenger side and the driver side of the vehicle.

10. The system of claim 6, wherein the processor is further configured to determine the one or more comfort scores based on application of the offset to a plurality of points of the vehicle, including a longitudinal center of the front doors of the vehicle and a longitudinal center of the rear doors of the vehicle, and wherein the plurality of points are selected by the processor in a manner that ensures that at least a predetermined minimum distance is maintained between the vehicle, including the predetermined points of the vehicle, and the other vehicles and other objects in proximity to the vehicle.

11. A vehicle comprising:
a body;
a drive system configured to generate movement of the body;
one or more sensors, including in-cabin cameras, seat sensors, and detection sensors of the vehicle, that are configured for obtaining sensor as to passenger occupancy of the vehicle and as to a parking location for the vehicle; and
a processor that is coupled to the sensor data and that is configured to at least facilitate:
identifying which passenger seats of the vehicle are occupied by occupants, based on the sensor data, including from the in-cabin cameras and the seat sensors;
identifying the parking location based on the sensor data; and
determining an offset for parking of the vehicle in the parking location, based at least in part on which passenger seats of the vehicle are occupied by occupants, including by:
determining respective distances between both a driver side of the vehicle and a passenger side of the vehicle with respect to other vehicles, other objects, and parking lines in proximity to the vehicle and the parking location;
determining, based on the respective distances, whether parking in a center of the parking location would impair driver side occupants from exiting the vehicle without contacting one or more of the other vehicles or other objects;
determining, based on the respective distances, whether parking in the center of the parking location would impair passenger side occupants from exiting the vehicle without contacting one or more of the other vehicles or other objects;
shifting the offset from the center toward the passenger side when it is determined by the processor that parking in the center of the parking location would impair driver side occupants, but not passenger side occupants, from exiting the vehicle without contacting one or more of the other vehicles or other objects;
shifting the offset from the center toward the driver side when it is determined by the processor that parking in the center of the parking location would impair passenger side occupants, but not driver side occupants, from exiting the vehicle without contacting one or more of the other vehicles or other objects;
maintaining the offset in the center of the parking location when it is determined by the processor that parking in the center of the parking location would impair both driver side occupants and rear side occupants from exiting the vehicle without contacting one or more of the other vehicles or other objects; and
maintaining the offset in the center of the parking location when it is determined by the processor that parking in the center of the parking location would impair neither the driver side occupants nor the rear side occupants from exiting the vehicle without contacting one or more of the other vehicles or other objects; and
taking a vehicle control action, in accordance with instructions provided by the processor, based on the determined offset for parking of the vehicle in the parking location; wherein:
the vehicle further includes a plurality of doors, including a front driver side door, a front passenger side door, a rear driver side door, and a rear passenger side door; and
the processor is further configured to determine the offset further based on one or more comfort scores that are calculated by the processor based on positions of each of the plurality of doors of the vehicle, including the front driver side door, the front passenger side door, the rear driver side door, and the rear passenger side door, with respect to one or more other vehicles, other objects, and lane markings in proximity to the vehicle and the parking location.

12. The vehicle of claim 11, wherein the processor is further configured to at least facilitate automatically parking the vehicle using the offset.

13. The vehicle of claim 11, wherein the processor is further configured to at least facilitate performing assistance for a human for parking the vehicle in the parking location using the offset, via instructions provided by the processor as presented to a human driver via a display of the vehicle.

14. The vehicle of claim 11, wherein the processor is further configured to at least facilitate determining the offset based at least in part on which occupants are disposed only in a passenger side of the vehicle, only in a driver side of the vehicle, or both the passenger side and the driver side of the vehicle.

15. The vehicle of claim 11, wherein the processor is further configured to determine the one or more comfort scores based on application of the offset to a plurality of points of the vehicle, including a longitudinal center of the front doors of the vehicle and a longitudinal center of the rear doors of the vehicle, and wherein the plurality of points are selected by the processor in a manner that ensures that at least a predetermined minimum distance is maintained between the vehicle, including the predetermined points of the vehicle, and the other vehicles and other objects in proximity to the vehicle.

16. The vehicle of claim 15, wherein the processor is further configured to determine the one or more comfort scores based also on a straightness of parking of the vehicle in the parking location.

17. The vehicle of claim 11, wherein the processor is further configured to determine the one or more comfort scores based on or both of the following equations:

$$\text{Score}_{Comfort} = K_{driver}(\text{Score}_{marginToOpenDriverSideDoors}) + K_{passenger}(\text{Score}_{marginToOpenPassengerSideDoors}) + K_{straightness}(\text{Score}_{varianceInOffsetOfPoints}); \text{ and}$$

$$\text{Score}_{Comfort} = K_{straightness}(\text{Score}_{varianceInOffsetOfPoints}) + K_{driver}(\Sigma_{Driver\ Side\ Doors} e^{-1 \times K_{comfort} \times (W_{door} - d_{toObstacle})}) + K_{passenger}(\Sigma_{Passenger\ Side\ Doors} e^{-1 \times K_{comfort} \times (W_{door} - d_{toObstacle})}).$$

* * * * *